(12) United States Patent
Shiba et al.

(10) Patent No.: US 6,912,919 B2
(45) Date of Patent: Jul. 5, 2005

(54) RESTRICTION FLOWMETER

(75) Inventors: Yoshijiro Shiba, Tokyo (JP); Masakazu Saito, Tokyo (JP); Shigehito Yamada, Tokyo (JP)

(73) Assignee: Wetmaster Co., Ltd., Tokyo (JP)

(*) Notice: Subject to any disclaimer, the term of this patent is extended or adjusted under 35 U.S.C. 154(b) by 0 days.

(21) Appl. No.: 10/485,154

(22) PCT Filed: Aug. 1, 2002

(86) PCT No.: PCT/JP02/07863
§ 371 (c)(1),
(2), (4) Date: Jan. 29, 2004

(87) PCT Pub. No.: WO2004/013580
PCT Pub. Date: Feb. 12, 2004

(65) Prior Publication Data
US 2004/0187598 A1 Sep. 30, 2004

(51) Int. Cl.[7] .................................................. G01F 1/37
(52) U.S. Cl. .................................................. 73/861.52
(58) Field of Search .................... 73/861.65, 861.63, 73/861.52, 861.75, 861.61

(56) References Cited

U.S. PATENT DOCUMENTS 3,802,265 A * 4/1974 Wood ...................... 73/861.47
5,365,795 A * 11/1994 Brower, Jr. ............... 73/861.65
5,379,650 A * 1/1995 Kofoed et al. ............. 73/861.52
6,164,142 A * 12/2000 Dimeff ..................... 73/861.61
6,312,389 B1 * 11/2001 Kofoed et al. .............. 600/532

FOREIGN PATENT DOCUMENTS

| JP | 32-6282 | 6/1932 |
| JP | 8-210887 A | 8/1996 |
| JP | 10-253409 A | 9/1998 |

* cited by examiner

Primary Examiner—Edward Lefkowitz
Assistant Examiner—Jewel Thompson
(74) Attorney, Agent, or Firm—Burns, Doane, Swecker & Mathis, L.L.P.

(57) ABSTRACT

A restriction flowmeter including a cylinder through whose interior a fluid to be measured flows and a pipe for forming a restriction structure penetrating the cylinder in a direction perpendicular to the central axis of the cylinder, the pipe having a diameter smaller than the inner diameter of the cylinder, characterized in that a first pressure measuring hole is formed on the most restricted cross section perpendicular to the flow direction and a second pressure measuring hole is formed on a wall of the cylinder located upstream which is away from the most restricted cross section by ½ or more of the inner diameter of the cylinder.

20 Claims, 8 Drawing Sheets

RESTRICTION FLOWMETER

TECHNICAL FIELD

The present invention relates to a restriction flowmeter for measuring a flow rate or flow velocity of a fluid in a pipe.

BACKGROUND ART

As one of measuring instruments for measuring a flow rate of a fluid flowing through a pipe, a differential pressure detector is conventionally used and this differential pressure detector constitutes a restriction flowmeter which allows an orifice or venturi tube, etc., having a restriction portion to measure a hydrostatic differential pressure using a manometer and which enables a flow velocity or flow rate to be measured.

Such a conventional differential pressure detector requires precise machining as specified in the Japanese Industrial Standard and its measuring accuracy decreases when the flow is disturbed, and therefore appropriate straight tubes need to be provided upstream and downstream from installed equipment. Furthermore, a differential pressure generated from the differential pressure detector is expressed by only one curve as a square equation of the flow velocity or flow rate of the fluid flowing through the pipe.

Moreover, when a fluid to be measured is liquid, erosion with use for an extended period of time causes wear in the edge or deposition of sludge before and after the restriction portion causes deterioration of measuring accuracy.

However, the above described background art requires precise machining, hence a cost increase, which produces some cases where installation of the differential pressure detector is passed up despite the necessity for flow rate measurements. Especially consumer buildings which are most behind in a $CO_2$ reduction, an environmental issue gathering attention nowadays, are required to exercise energy-saving control over heat sinks, but differential pressure detectors are hardly installed for reasons related to initial costs.

Moreover, a differential pressure detector based on the conventional art needs to be installed in a place where the flow of a fluid through the pipe is rectified so as to maintain the measuring accuracy. When it is installed, for example, after a local resistance section such as an R elbow, quite a long straight pipe needs to be provided, and therefore it is hard to use the differential pressure detector because of constraints in a place where it is actually used.

Furthermore, according to the differential pressure detector based on the conventional art, the relationship between a differential pressure generated and the flow velocity or flow rate of a fluid is expressed by a square curve, and therefore when measurements are made from a low flow velocity area to high flow velocity area using a single manometer, the range of the differential pressure generated is wide and a large measuring error may occur in the low flow velocity area depending on the performance of the manometer. Furthermore, there is a problem that use for an extended period of time causes wear in the edge or deposition of sludge and causes deterioration of measuring accuracy.

Furthermore, when a Pitot tube is used as a conventional differential pressure detector, a total pressure and hydrostatic pressure are extracted and a differential pressure between them is obtained, but this can only obtain local velocities at measuring points and in order to calculate an average velocity, it is necessary to measure velocities at several points within the same cross section.

Furthermore, as disclosed in JP-A-8-210887, a tube member through which a fluid flows is provided with a total pressure detection cylinder member penetrating in a direction perpendicular to the axis of the tube member and this total pressure detection cylinder member is provided with a total pressure detection hole opened facing the flowing direction of the fluid and the wall of the tube member is provided with an opening so as to detect a hydrostatic pressure.

However, while this differential pressure detector can detect at a plurality of points on the same cross section, it cannot detect a large differential pressure in a low flow velocity area.

The present invention has been implemented in view of the above described problems and it is an object of the present invention to provide a restriction flowmeter, which is a low-priced product without requiring precise machining, capable of measuring with a high degree of accuracy even under disturbed flow conditions, expressing the relationship between a differential pressure generated from the differential pressure detector, flow velocity and flow rate as a plurality of square curves and maintaining stable measuring accuracy for a long period of time.

DISCLOSURE OF THE INVENTION

In order to attain the above described object, the restriction flowmeter according to the present invention comprises a cylinder through whose interior a fluid to be measured flows and a pipe for forming a restriction structure penetrating the cylinder in a direction perpendicular to the central axis of the cylinder, the pipe having a diameter smaller than the inner diameter of the cylinder, characterized in that a first pressure measuring hole is formed on the most restricted cross section perpendicular to the flow direction and a second pressure measuring hole is formed on a wall of an upstream cylinder which is away from the most restricted cross section by ½ or more of the inner diameter of the cylinder.

The above described restriction flowmeter is characterized in that the first pressure measuring hole is formed on the wall of the cylinder on the most restricted cross section.

Furthermore, the above described restriction flowmeter is characterized in that the first pressure measuring hole is formed on the wall of the above described pipe on the most restricted cross section.

Furthermore, the above described restriction flowmeter is characterized in that the first pressure measuring hole is formed on the wall of the pipe downstream from the most restricted cross section.

The restriction flowmeter is characterized in that a rectification plate is provided upstream from the second pressure measuring hole by ½ or more of the inner diameter of the cylinder inside the cylinder.

The above described restriction flowmeter is characterized in that a flat-shaped hollow member having a bullet type cross section is provided upstream from the most restricted cross section perpendicular to the flow direction of the fluid in the cylinder, a first pressure measuring hole is formed on the most restricted cross section, a second pressure measuring hole is formed on the wall of the above described cylinder upstream from the hollow member and a third pressure measuring hole is formed in the hollow member to be opened in the flow direction.

Furthermore, the restriction flowmeter is characterized in that the first pressure measuring hole is formed on the wall of the above described cylinder on the most restricted cross section.

Furthermore, this restriction flowmeter is characterized in that the first pressure measuring hole is formed on the wall of the pipe on the above described most restricted cross section or on the wall of the above described pipe downstream from the first pressure measuring hole.

Furthermore, the restriction flowmeter is characterized in that it is possible to select any two of the first, second and third pressure measuring holes, detect a differential pressure between the selected pressure measuring holes and thereby obtain a differential pressure appropriate for a manometer in a flow velocity area in a wide range.

In the above described restriction flowmeter of the present invention, the relationship between a pressure detected by each pressure measuring hole, differential pressure and flow velocity will be explained.

The differential pressure detector of the restriction flowmeter of the present invention has a structure in which a pipe penetrates a cylinder in a direction perpendicular to the central axis of the cylinder and portion of the cross section of the conduit is restricted. Because the flow velocity increases on this restricted cross section, a hydrostatic pressure $P_1$ in a first pressure measuring hole provided on the pipe wall on the cross section decreases as a result. Assuming that a hydrostatic pressure detected in a second pressure measuring hole provided on the cylinder wall upstream from this restricted cross section by ½ or more of the inner diameter of the cylinder is $P_2$, it is possible to calculate the flow velocity in the cylinder by measuring such a decrement of the pressure, that is, differential pressure $\Delta P$ ($=P_2-P_1$) using a manometer according to the following function:

$$V=K*(2/\rho*\Delta P)^{0.5}$$

where K: flow rate coefficient, $\rho$: density of fluid, $\Delta P$: differential pressure generated (decrement of hydrostatic pressure)

In the above described function, it is possible to change the restriction ratio of the conduit according to the diameter of the penetrating pipe as appropriate and adjust the flow rate coefficient K as in the case where an orifice is used.

For example, when the flow velocity is low, it is possible to install a pipe of a greater diameter penetrating the cylinder, increase the restriction and thereby increase a differential pressure generated.

On the other hand, when the flow velocity is high, it is also possible to use a pipe of a smaller diameter, decrease the restriction and thereby decrease a differential pressure generated and suppress pressure loss.

Generally, the piping provided with such a restriction flowmeter requires complicated three-dimensional processing for space-related reasons, and therefore the velocity distribution of the fluid which flows there shows an undeveloped, unstable flow. Measuring the flow rate accurately in such a condition requires the conventional differential pressure detector to be provided with sufficiently long straight tubes in the upstream and downstream areas.

Therefore, the flowmeter according to the present invention adds a rectification function inside the differential pressure detector to thereby correct unbalance in the velocity distribution and drastically reduce constraints in piping processing.

The measuring error rate of a manometer generally decreases as the differential pressure increases, and therefore it is possible to reduce an overall error rate including the differential pressure detector and manometer by increasing the detected pressure from the fluid.

When the restriction structure is formed of a round pipe or rectangular pipe, etc., the velocity distribution on the cross section tends to increase in the vicinity of the area where the restriction structure is formed and decrease in the area closer to the cylinder wall, and therefore it is possible to have a large differential pressure with respect to the pressure $P_2$ at the second pressure measuring hole by detecting pressure $P_3$ ($<P_1$) on the pipe wall of the restriction forming portion. In this way, it is appropriate to provide a pressure measuring hole on the wall of the restriction forming portion such as a pipe.

Furthermore, using a flat-shaped porous pipe having a rectification function placed upstream from the restriction forming portion can further increase the differential pressure with respect to other pressures by detecting a pressure $P_4$ (total pressure) of the fluid and selecting and using a measuring hole so as to obtain a differential pressure according to the flow velocity taking into account errors in the manometer allows more appropriate measurement.

For this purpose, it is appropriate to use a flat-shaped hollow member whose cross section is bullet-shaped as the porous pipe having the rectification function and use of this hollow member makes it possible to shorten the straight tubes in the upstream and downstream areas of the differential pressure detector in the above described pipe processing and also produce the effect of reducing such constraints.

By combining pressures like the pressure $P_4$ from this porous pipe, pressure $P_2$ from the pressure measuring hole provided on the cylinder wall upstream from the porous pipe and the penetrating pipe, pressure $P_1$ on the cylinder wall on the cross section of the restriction forming portion in which the penetrating pipe is placed or pressure $P_3$ from the pressure measuring hole provided on the pipe wall of the restriction forming portion as appropriate, various relational equations are obtained which are expressed by the following equations relating to the differential pressure generated and flow velocity:

$$V=K1*(2/\rho*(P_4-P_1))^{0.5}$$

$$V=K2*(2/\rho*(P_4-P_2))^{0.5}$$

$$V=K3*(2/\rho*(P_4-P_3))^{0.5}$$

where K1, K2, K3, . . . are flow rate coefficients and are constants determined by the combination of detected pressures.

As described above, by combining the pressures from three or more pressure measuring holes, the manometer can make measurements in a differential pressure area with a high degree of accuracy and reduce an overall measuring error rate as a consequence.

Furthermore, when provided with a temperature sensor inside, the penetrating pipe can also serve as a calorimeter and with the built-in temperature sensor it also has an advantage of avoiding damage to the temperature sensor due to eddy vibration, etc.

Other objects, features and advantages of the invention will become more apparent from the following detailed description of a preferred embodiment of the invention with reference to the drawings.

BEST MODE FOR CARRYING OUT THE INVENTION

With reference now to the attached drawings, the restriction flowmeter according to embodiments of the present invention will be explained below.

Figure 1:
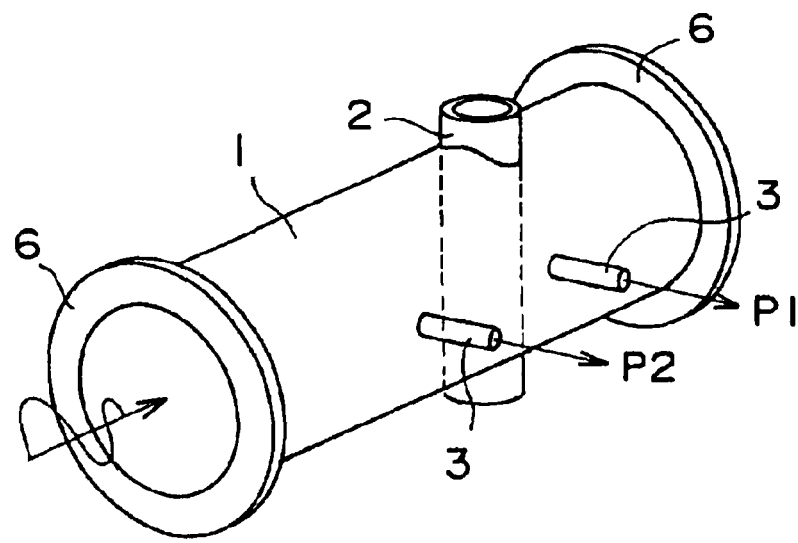
FIG. 1 is a perspective view of a restriction flowmeter according to an embodiment of the present invention.
Figure 2:
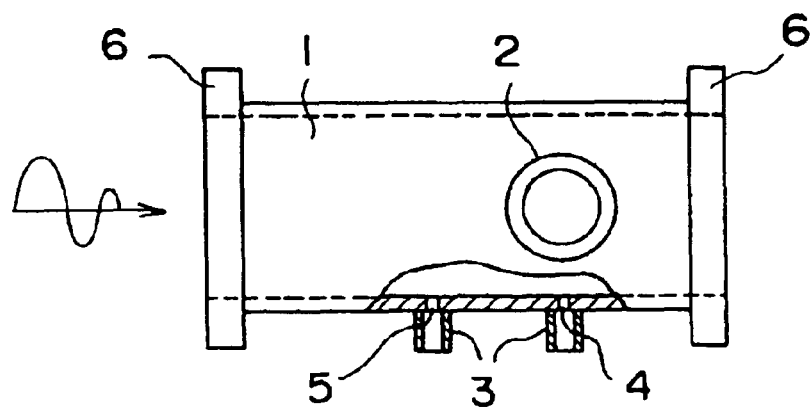
FIG. 2 is a partially broken top view of the flowmeter shown in FIG. 1.

FIG. 1 is a perspective view of a restriction flowmeter according to an embodiment of the present invention, which comprises a cylinder 1 having a predetermined length through which a fluid to be measured flows in the direction indicated by an arrow and a pipe 2 penetrating this cylinder 1 in a direction perpendicular to the central axis of the cylinder with both ends projecting from the wall thereof, wherein this pipe 2 forms a restriction structure. Furthermore, on the cross section of the cylinder 1 on which the most restricted area is formed by this pipe 2, a first pressure measuring hole 4 is formed on the wall of the cylinder 1 and a second pressure measuring hole 5 is formed upstream on the wall of the cylinder 1 away from this first pressure measuring hole 4 by ½ or more of the inner diameter of the cylinder 1 and these measuring holes 4 and 5 are provided with connectors 3, 3 to extract pressures and further flanges 6 are provided at both ends of the cylinder 1 to allow mounting on the piping system as shown in FIG. 14.

The material of these cylinder 1 and pipe 2 can be metal such as cast iron, other steel, brass, or resin or any other material and the condition of the surface in contact with which a fluid flows can be the surface of a normal raw material, requiring no particularly accurate finish.

Figure 14:
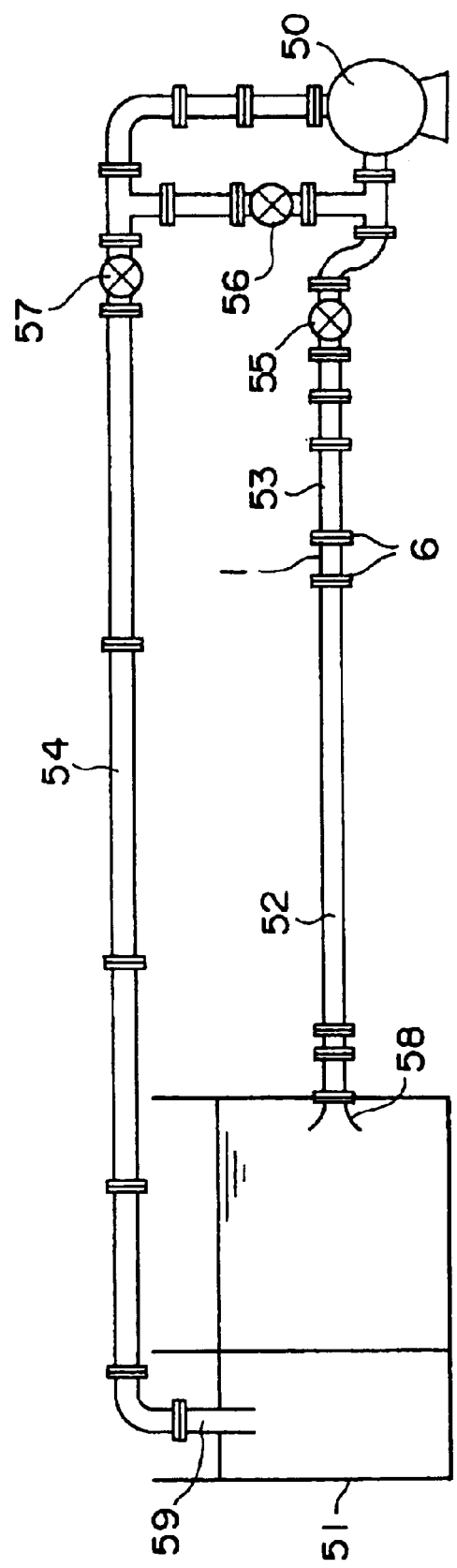
FIG. 14 is a schematic view showing an example of a piping system to which the restriction flowmeter according to the present invention is applied.

The piping system shown in FIG. 14 comprises conduits 52, 53 and 54, etc., placed between a pump 50 and a water intake section 58 and a water discharge section 59 of a water storage tank 51 through valves 55, 56 and 57, and the cylinder 1 of the restriction flowmeter is inserted between the straight pipes 52 and 53 by means of the flanges 6, making it possible to measure a flow velocity and flow rate.

With the restriction flowmeter in the above described configuration, it is possible to extract the pressure $P_1$ of the fluid which flows through the restriction portion from the first pressure measuring hole 4 on the wall of the cylinder 1 as a hydrostatic pressure through the connector 3 and extract the pressure $P_2$ of the fluid upstream from the restriction portion from the second pressure measuring hole 5 as a hydrostatic pressure through the connector 3.

In that case, both pressures are detected in a relationship of $P_1<P_2$. It is possible to calculate the flow velocity and flow rate using the differential pressure, $\Delta P=P_2-P_1$, of these pressures $P_1$ and $P_2$.

The restriction flowmeters according to an embodiment of the present invention shown in FIGS. 3 to 6 provide one rectification plate 7 further upstream from the second pressure measuring hole 5 in the cylinder 1 so as to eliminate unbalance in the velocity distribution. This is intended to rectify the flow in the cylinder 1 so as to eliminate influences of disturbance of the flow of the fluid on detected pressures at the measuring holes 4 and 5. This also makes it possible to shorten the straight pipes 52 and 53 to eliminate unbalance in the velocity distribution in pipings upstream and downstream from the flowmeter in the piping system shown in FIG. 14.

Figure 3:
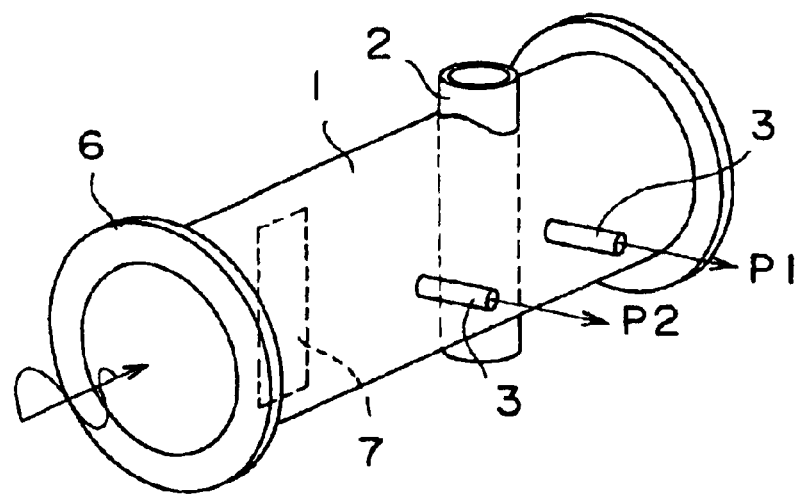
FIG. 3 is a perspective view of a restriction flowmeter according to an embodiment of the present invention as provided with a rectification plate.
Figure 4:
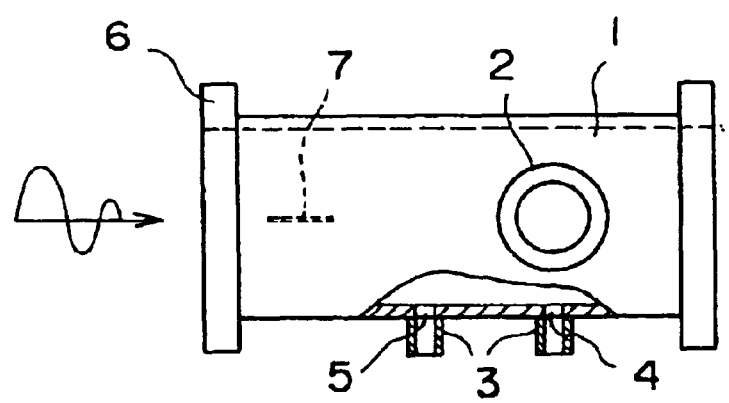
FIG. 4 is a partially broken top view of the rectification flowmeter shown in FIG. 3.
Figure 5:
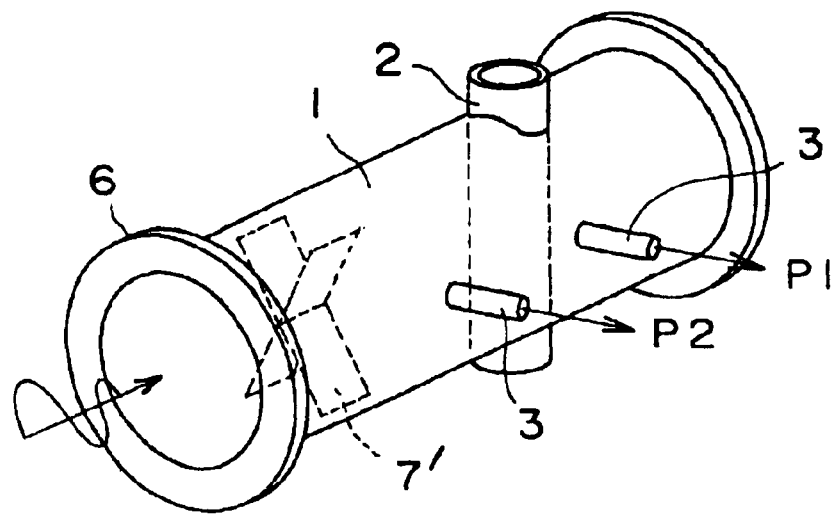
FIG. 5 is a perspective view of the rectification flowmeter shown in FIG. 3 as provided with a rectification plate according to another embodiment thereof.
Figure 6:
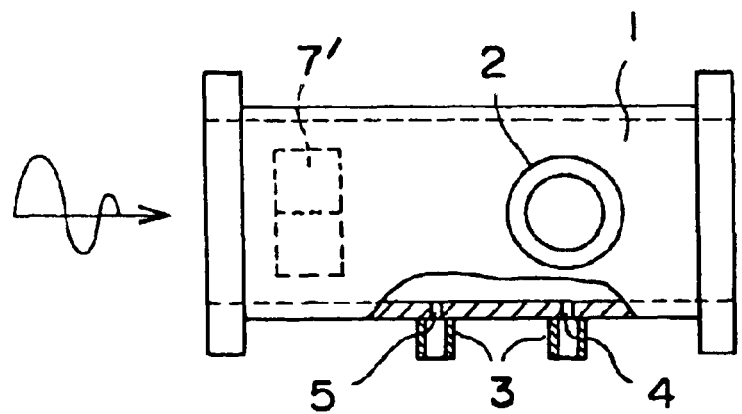
FIG. 6 is a partially broken top view of the rectification flowmeter shown in FIG. 5.

The rectification plate 7 shown in FIG. 3 and FIG. 4 is placed in parallel to the penetrating pipe 2. The restriction flowmeter shown in FIG. 5 and FIG. 6 is provided with a rectification plate 7' made up of two plates crossing each other inside the cylinder 1, which is also intended to eliminate unbalance in the velocity distribution as in the case of the one shown in FIG. 3 and FIG. 4. This rectification plate can also be of a mesh structure or a honeycomb structure.

Then, the restriction flowmeter according to another embodiment of the present invention will be explained with reference to FIG. 7 and FIG. 8. This is different from the restriction flowmeter in the above described embodiment in that the first pressure measuring hole is not provided on the wall of the cylinder 1 but on the wall of a pipe 2' which penetrates the cylinder 1. The velocity distribution of the fluid on the most restricted cross section in this case is as shown in FIG. 9, which indicates that it is possible to measure pressures in a high velocity area more than when the first pressure measuring hole is provided on the wall of the cylinder 1.

Figure 8:
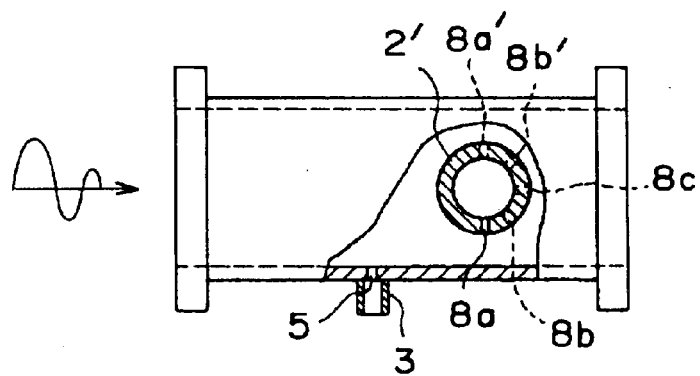
FIG. 8 is a partially broken top view of the restriction flowmeter shown in FIG. 7.
Figure 9:
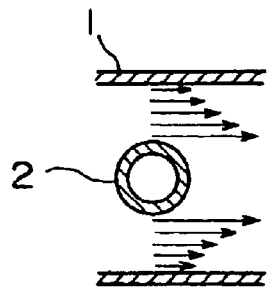
FIG. 9 is a cross sectional view showing a velocity distribution of a restriction portion in the same restriction flowmeter as that of FIG. 7.

Considering this velocity distribution, it is also possible to provide the first pressure measuring hole on the pipe 2' as a detection hole 8a located on the area where the watercourse is most restricted or a detection hole 8b downstream from the most restricted cross section as shown by dotted line in FIG. 8 or detection hole 8c located most downstream as shown by dotted line in FIG. 8. Of these detection holes, for the detection holes 8a and 8b, it is also possible to form detection holes 8a' and 8b' at positions symmetric with respect to the center line of the pipe 2' in the flow line direction in FIG. 8 as the pressure measuring holes 8a–8a' or pressure measuring holes 8b–8b'.

Furthermore, these pressure measuring holes 8a—8a', 8b—8b' and 8c can also be provided at two or more locations on the wall of the pipe 2' along the axis of the pipe 2' at the positions of the respective detection holes 8a (8a'), 8b (8b')

and 8*c* in the downstream area of the most restricted cross section of the pipe 2'.

The pressures from these detection holes 8*a* (8*a*'), 8*b* (8*b*') and 8*c* are extracted from a connector 3' at the end of the pipe 2' as a pressure $P_3$. This detected pressure $P_3$ has a relationship of $P_3<P_2$ and is detected from the connector 3'. The flow velocity and flow rate can be calculated from the differential pressure between these pressures $P_2$ and $P_3$, $\Delta P=P_2-P_3$.

Figure 7:
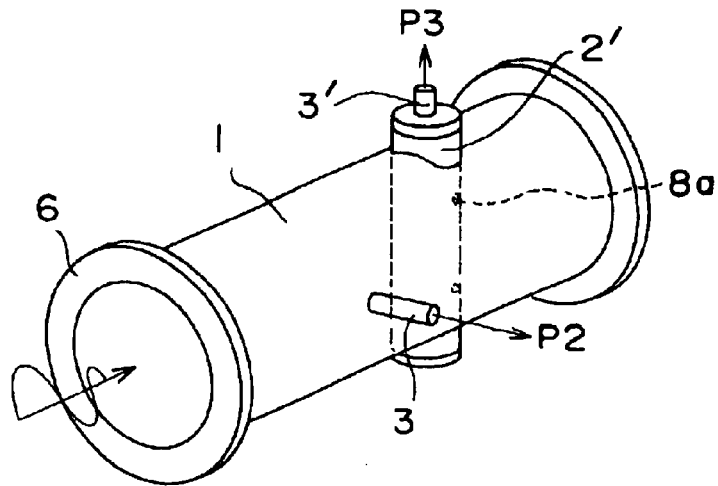
FIG. 7 is a perspective view of a rectification flowmeter according to another embodiment of the present invention.

The restriction flowmeter shown in FIG. 7 and FIG. 8 can be provided with the rectification plates 7 and 7' as shown in FIGS. 3 to 6 and the provision of these plates can rectify the flow of the fluid and thereby correct unbalance in the velocity distribution.

A further embodiment of the restriction flowmeter of the present invention will be explained using the restriction flowmeters shown in FIGS. 10 to 13.

The restriction flowmeter in this embodiment differs from the one shown in FIGS. 1 to 7 above in that a flat-shaped hollow member 10 having a bullet-shaped cross section is provided between the pipe 2, 2' and the second pressure measuring hole 5 in the cylinder 1 in parallel to the pipe 2, 2' and this hollow member 10 has the function of rectification. This hollow member 10 is provided with a plurality of pressure measuring holes 11 at appropriate intervals along the wall of the hollow member 10 which is perpendicular to the axis of the cylinder 1 at the end against the flow of the fluid and the pressure detected by the third pressure measuring holes 11 is extracted from the top end which protrudes outward of the cylinder 1 as a pressure $P_4$ and detected as a total pressure.

From a combination of this pressure $P_4$, pressure $P_2$ detected from the second pressure measuring hole 5 of the wall of the cylinder 1 upstream therefrom or pressure $P_1$ ($<P_2$) from the first pressure measuring hole 4 provided on the wall of the cylinder 1 on the cross section where the watercourse is most restricted, it is possible to measure a differential pressure $\Delta P=P_4-P_1$ (or $\Delta P=P_4-P_2$) and thereby calculate the flow velocity and flow rate.

Figure 10:
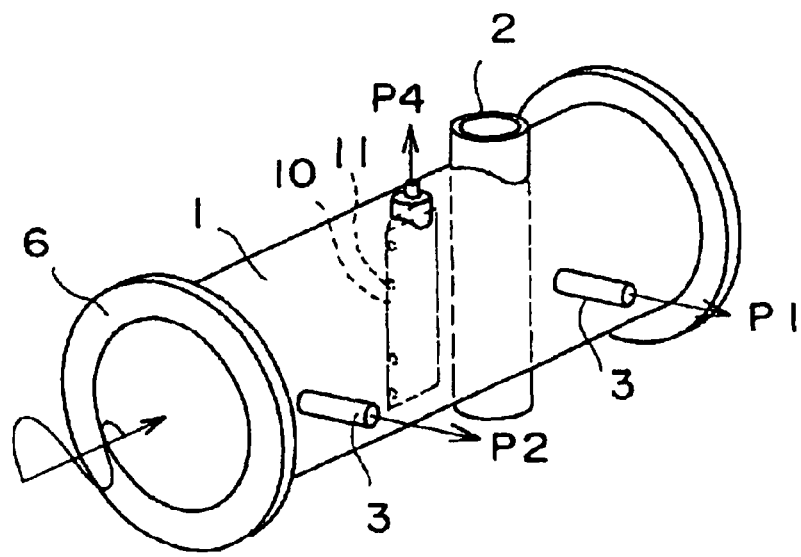
FIG. 10 is a perspective view of a restriction flowmeter according to a further embodiment of the present invention.
Figure 11:
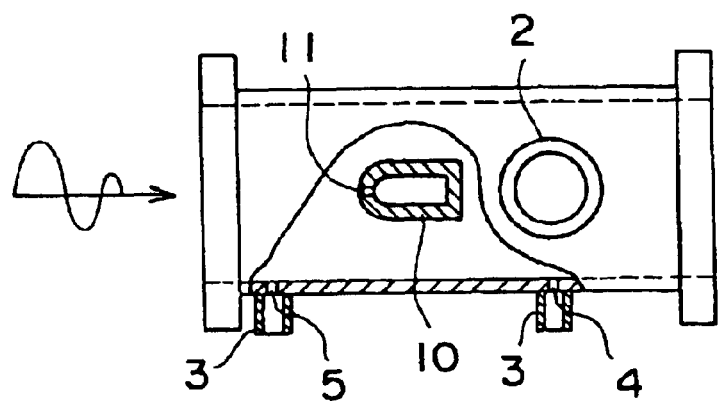
FIG. 11 is a partially broken top view of the restriction flowmeter shown in FIG. 10.
Figure 12:
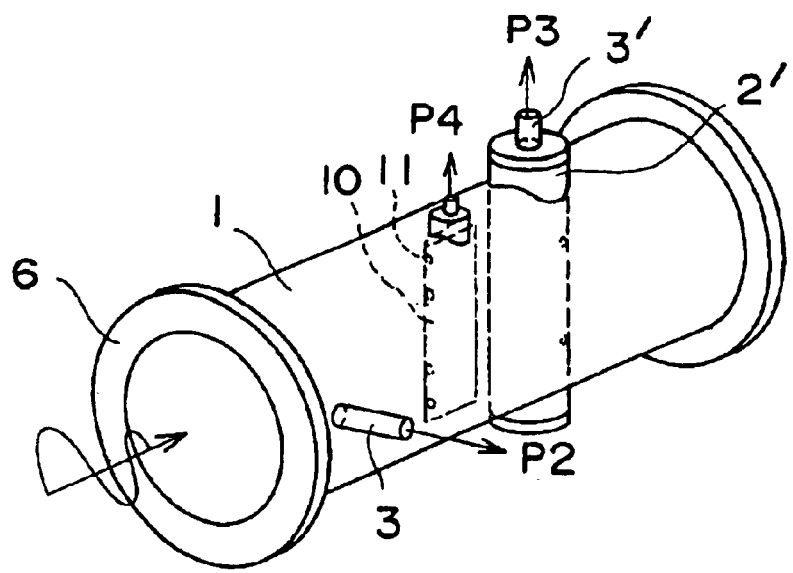
FIG. 12 is a perspective view of a restriction flowmeter according to a still further embodiment of the present invention.
Figure 13:
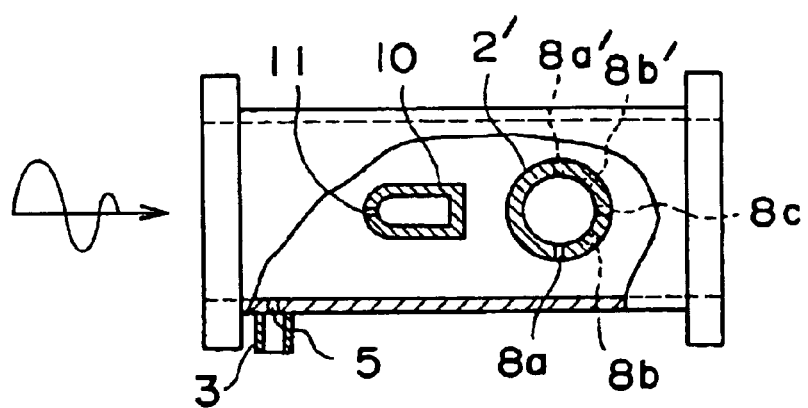
FIG. 13 is a partially broken top view of the restriction flowmeter shown in FIG. 12.

The restriction flowmeter shown in FIG. 12 and FIG. 13 is the restriction flowmeter shown in FIG. 7 and FIG. 8 provided with a flat-shaped hollow member 10 having a bullet-shaped cross section shown in FIG. 10 and FIG. 11. This hollow member 10 has the same rectification function and is provided, as the third pressure measuring holes 11, with a plurality of pressure measuring holes 11 opened at appropriate intervals perpendicular to the axis of the cylinder 1 at the end against the flow of the fluid. The third pressure measuring holes 11 can detect a pressure $P_4$ as a total pressure.

From a combination of this pressure $P_4$, pressure $P_2$ detected from the second pressure measuring hole 5 of the wall of the cylinder 1 upstream therefrom or pressure $P_3$ ($<P_1$) detected from any one of the pressure detection holes 8*a* (8*a*'), 8*b* (8*b*') and 8*c* on the wall of the pipe 2 which penetrates the cylinder 1, it is possible to measure a differential pressure and thereby calculate the flow velocity and flow rate.

Figure 15:
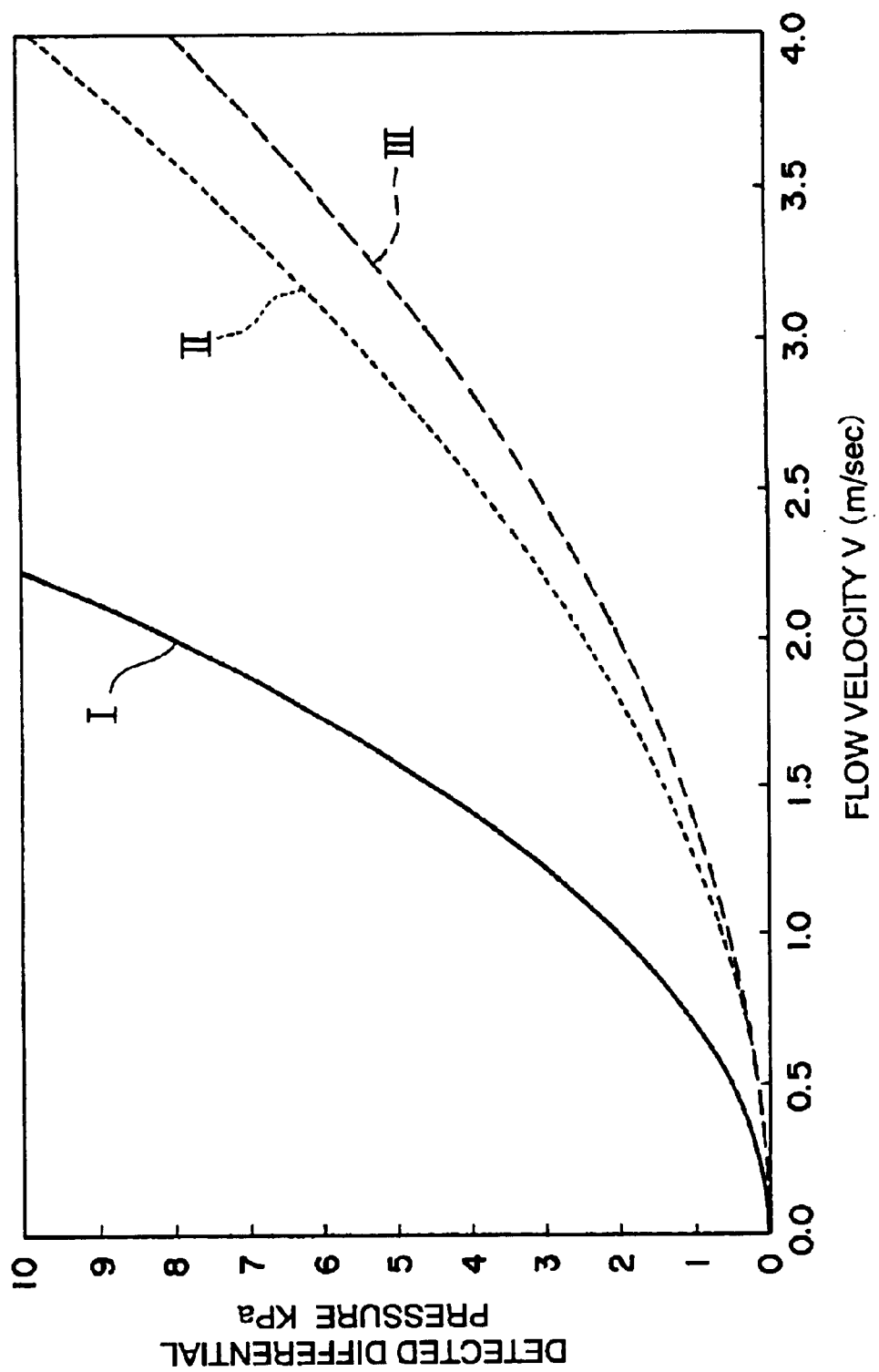
FIG. 15 is a diagram showing a relationship between a differential pressure and flow velocity obtained by the restriction flowmeter according to the present invention.

FIG. 15 shows an example of a relationship between the differential pressure and flow velocity of the fluid obtained by selecting and combining pressures from the second pressure measuring hole 5, first pressure measuring hole 4, detection holes 8*a*, 8*b* and 8*c* of the pipe 2 or the third pressure measuring hole 11 of the flat-shaped hollow member 10.

Curves I, II and III shown in FIG. 15 each show a relationship of the differential pressure between the respective pressure measuring holes versus the flow velocity as follows. The curve I shows the relationship of the differential pressure between the hydrostatic pressure from the first pressure measuring hole which is any one of the pressure detection holes 8*a* (8*a*'), 8*b* (8*b*') and 8*c* of the pipe 2, 2' and the total pressure extracted from the third pressure measuring hole 11 of the flat-shaped hollow member 10 versus the flow velocity of the fluid. Furthermore, the curve II shows the relationship of the differential pressure between the hydrostatic pressure from the first pressure measuring hole 4 provided on the most restricted cross section on the wall of the cylinder 1 and the hydrostatic pressure from the second pressure measuring hole 5 which is provided upstream from the flat-shaped hollow member 10 of the cylinder 1 versus the flow velocity of the fluid. Furthermore, the curve III shows the relationship of the differential pressure between the hydrostatic pressure from the second pressure measuring hole 5 of the cylinder 1 and the total pressure from the third pressure measuring hole 11 of the flat-shaped hollow member 10 versus the flow velocity of the fluid. Among the pressures measured at these pressure measuring holes, the pressure from the pressure measuring holes 11 of the flat-shaped hollow member 10 is measured as the total pressure, and is therefore highest, while the pressures measured at other pressure measuring holes 4, 5, 8*a* (8*a*'), 8*b* (8*b*') and 8*c* are hydrostatic pressures, and the pressure detected from the second pressure measuring hole 5 is the lowest hydrostatic pressure, followed by the pressure detected from the first pressure measuring hole 4 and the pressures detected from the pressure measuring holes 4, 5, 8*a* (8*a*'), 8*b* (8*b*') and 8*c* of the pipe 2, 2', and therefore by selecting two of these pressure measuring holes, it is possible to selectively extract the differential pressure suitable for the flow velocity of the fluid to be measured. The flow velocity and flow rate can be calculated using this differential pressure and the above described equation.

More specifically, as is apparent from FIG. 15, considering the measurement range and error of the manometer, etc., when, for example, the maximum measuring range of the manometer is 10 Kpa, the curve I is valid for a measurement of a fluid having a flow velocity of 2 m/s or less, the curve II is valid for a measurement of a fluid having a flow velocity of 2 m/s to 4 m/s and the curve III is valid for a measurement of a fluid having a flow velocity of 4 m/s or greater. Thus, it is possible to calculate a flow velocity with a high degree of accuracy considering the measuring error of the manometer, etc. and selecting the curve which can obtain a large differential pressure within the flow velocity range to be measured. The curve III shown in FIG. 15 only shows a flow velocity of up to 4 m/s, but it is possible to obtain the differential pressure using substantially the same curve.

Based on such curves I, II and III, considering the relationship between the differential pressure with little influence of the measuring error of the manometer and the flow velocity, and by selecting any two of the first pressure measuring hole 4 on the most restricted cross section of the cylinder 1 shown in FIGS. 10 to 13, the pressure measuring holes 8*a* (8*a*'), 8*b* (8*b*') and 8*c* provided on the pipe 2 and the third pressure measuring holes 11 of the flat-shaped hollow member 10, detecting the pressure from both measuring holes and obtaining the differential pressure, it is possible to calculate the flow velocity and flow rate of the fluid from the differential pressure.

The fluid that can be applied to the above described restriction flowmeter is not particularly specified but it goes without saying that the present restriction flowmeter is applicable to a liquid like water or gas like air, etc., and it is also applicable to a fluid mixed with impurities such as sand and mud.

As described above, the restriction flowmeter according to the present invention can produce the following advantageous effects:

The restriction flowmeter can be formed using a cylinder and pipe which can be used for general purposes irrespective of its material and requires no precise machining, and can thereby be provided as a low-priced flowmeter.

This restriction flowmeter provides a rectification plate at the most upstream area of the cylinder, and can thereby eliminate unbalance in the velocity distribution, reduce the length of the straight pipes designed to eliminate unbalance in the velocity distribution between the upstream and downstream of the cylinder and perform measurements with a high degree of accuracy even in an environment with a small space.

Furthermore, when the fluid is a liquid, this restriction flowmeter structurally has fewer edges or points producing stagnation, has less wear due to erosion or less deposition of sludge, and can thereby maintain measurements with a high degree of accuracy for an extended period of time.

The differential pressure detector according to the conventional art which expresses the relationship between the differential pressure generated, flow velocity and flow rate of the fluid with only a square curve, thereby having the problem that when measurements are made from the low flow velocity to high flow velocity using a single manometer, the range of the differential pressure generated is wide and the measuring error increases in the low flow velocity area as the performance of the manometer. In contrast, the present invention can provide a structure having three or more pressure detection sections, and thereby obtain a plurality of combinations of pressure measuring holes to obtain a differential pressure, reduce an overall error rate including the manometer and measure a wide range of flow velocity and flow rate areas with a high degree of accuracy.

The above descriptions have been presented about the embodiments, but the present invention is not limited to them and it is obvious to those skilled in the art that the present invention can be changed or modified in various ways within the scope of the spirit of the present invention and the claims attached herein.

INDUSTRIAL APPLICABILITY

The restriction flowmeter of the present invention provides a fluid pressure measuring apparatus without requiring high precision machining and carries out pressure measurements in a wide range to obtain a differential pressure, and can thereby measure flow velocity and flow rate in a wide range.

What is claimed is:

1. A restriction flowmeter comprising:
   a cylinder through whose interior a fluid to be measured flows;
   a pipe penetrating said cylinder in a direction perpendicular to a central axis of said cylinder, said pipe having a diameter smaller than the inner diameter of said cylinder and forming a most restricted cross-section within said cylinder,
   wherein a first pressure measuring hole is formed on the most restricted cross section perpendicular to the flow direction, and
   a second pressure measuring hole is formed on a wall of said cylinder located upstream which is away from said most restricted cross section by ½ or more of the inner diameter of the cylinder.

2. The restriction flowmeter according to claim 1, wherein said first pressure measuring hole is formed on the wall of said cylinder on said most restricted cross section.

3. The restriction flowmeter according to claim 2, wherein said first pressure measuring hole is formed on the wall of said pipe on said most restricted cross section.

4. The restriction flowmeter according to claim 3, wherein the first pressure measuring hole is formed on said wall of the pipe downstream from said most restricted cross section.

5. The restriction flowmeter according to claim 4, wherein a rectification plate is provided upstream from said second pressure measuring hole by ½ or more of the inner diameter of said cylinder inside said cylinder.

6. The restriction flowmeter according to claim 3, wherein a rectification plate is provided upstream from said second pressure measuring hole by ½ or more of the inner diameter of said cylinder inside said cylinder.

7. The restriction flowmeter according to claim 2, wherein a rectification plate is provided upstream from said second pressure measuring hole by ½ or more of the inner diameter of said cylinder inside said cylinder.

8. The restriction flowmeter according to claim 1, wherein said first pressure measuring hole is formed on the wall of said pipe on said most restricted cross section.

9. The restriction flowmeter according to claim 1, wherein a rectification plate is provided upstream from said second pressure measuring hole by ½ or more of the inner diameter of said cylinder inside said cylinder.

10. A restriction flowmeter comprising:
    a cylinder through whose interior a fluid to be measured flows; and
    a pipe penetrating said cylinder in a direction perpendicular to the central axis of said cylinder, said pipe having a diameter smaller than the inner diameter of said cylinder,
    wherein a flat-shaped hollow member having a bullet type cross section is provided upstream from the most restricted cross section perpendicular to the flow direction of the fluid in said cylinder,
    a first pressure measuring hole is formed on said most restricted cross section,
    a second pressure measuring hole is formed on the wall of said cylinder located upstream from said hollow member, and
    a third pressure measuring hole is formed in said hollow member in the flow direction.

11. The restriction flowmeter according to claim 10, wherein said first pressure measuring hole is formed on the wall of said cylinder on said most restricted cross section.

12. The restriction flowmeter according to claim 11, wherein it is possible to select any two of said first, second and third pressure measuring holes, detect a differential pressure between said selected pressure measuring holes and thereby obtain a differential pressure appropriate for a manometer in a flow velocity area in a wide range.

13. The restriction flowmeter according to claim 10, wherein said first pressure measuring hole is formed on the wall of said pipe on said most restricted cross section or on the wall of said pipe located downstream from said first pressure measuring hole.

14. The restriction flowmeter according to claim 13, wherein it is possible to select any two of said first, second and third pressure measuring holes, detect a differential pressure between said selected pressure measuring holes and thereby obtain a differential pressure appropriate for a manometer in a flow velocity area in a wide range.

15. The restriction flowmeter according to claim 10, wherein it is possible to select any two of said first, second and third pressure measuring holes, detect a differential pressure between said selected pressure measuring holes and thereby obtain a differential pressure appropriate for a manometer in a flow velocity area in a wide range.

16. A restriction flowmeter comprising:
- a cylinder possessing an interior through which a fluid to be measured flows in a flow direction;
- a pipe penetrating said cylinder in a direction perpendicular to a central axis of said cylinder, said pipe having a diameter smaller than the inner diameter of said cylinder and forming a most restricted cross-section within said cylinder;
- a first pressure measuring hole formed on the most restricted cross section and opening perpendicular to the flow direction, the first pressure measuring hole being used to extract a hydrostatic pressure of the fluid flowing through the most restricted portion; and
- a second pressure measuring hole formed on a wall of said cylinder at a location upstream from said most restricted cross section relative to the flow direction by 1/12 or more of the inner diameter of the cylinder, the second pressure measuring hole being used to extract a hydrostatic pressure of the fluid upstream of the most restricted cross section portion relative to the flow direction, the second pressure measuring hole being formed on the wall of the cylinder at a location spaced from a location where the pipe penetrates the cylinder.

17. The restriction flowmeter according to claim 16, wherein said first pressure measuring hole is formed on the wall of said cylinder at said most restricted cross section.

18. The restriction flowmeter according to claim 16, wherein said first pressure measuring hole is formed on the wall of said pipe at said most restricted cross section.

19. The restriction flowmeter according to claim 16, wherein the first pressure measuring hole is formed on said wall of the pipe downstream from said most restricted cross section.

20. The restriction flowmeter according to claim 16, wherein a rectification plate is provided upstream from said second pressure measuring hole by ½ or more of the inner diameter of said cylinder.

* * * * *